United States Patent [19]

Bartlett

[11] 4,321,477
[45] Mar. 23, 1982

[54] ENERGY MANAGEMENT APPARATUS AND METHOD

[75] Inventor: Peter G. Bartlett, Davenport, Iowa

[73] Assignee: Automation System, Inc., Elridge, Iowa

[21] Appl. No.: 657,033

[22] Filed: Feb. 11, 1976

[51] Int. Cl.³ .............................................. H02J 3/00
[52] U.S. Cl. ...................................... 307/35; 307/39; 307/41; 307/126; 364/492
[58] Field of Search ....................... 307/31, 35, 38–41, 307/52, 57, 85–87, 126; 340/309.1, 147 R; 364/492–494

[56] References Cited

U.S. PATENT DOCUMENTS

| | | | |
|---|---|---|---|
| 3,521,077 | 7/1970 | Buenzle, Jr. | 307/31 |
| 3,714,453 | 1/1973 | Delisle et al. | 307/39 |
| 3,872,286 | 3/1975 | Putman | 364/493 X |
| 3,903,515 | 9/1975 | Haydon et al. | 340/309.1 X |
| 3,987,308 | 10/1976 | Burch | 307/52 X |

Primary Examiner—Michael L. Gellner
Attorney, Agent, or Firm—Woodard, Weikart, Emhardt & Naughton

[57] ABSTRACT

An energy management system for a group of electrical loads such as in an industrial plant. The electrical power usage by the group of loads is elastically maintained between an upper set point and a lower low limit point, which is a percentage of the set point, at all times. The electrical load demand is presented in the form of a demand count to a comparator whose output provides a load display and couples load information to a sequencer. The sequencer cycles those loads which are off through the group of controlled loads and also varies the number of off loads in response to the comparator information. The set point floats and is responsive to actual power demand and a memory may be utilized to affect the sequencer operation dependent upon preprogrammed instructions for particular loads on particular days.

9 Claims, 10 Drawing Figures

ENERGY MANAGEMENT APPARATUS AND METHOD

BACKGROUND OF THE INVENTION

1. Field of the Invention

The invention is in the field of electrical load controllers.

2. Description of the Prior Art

Electrical utility bills are calculated from the total amount of kilowatt hours used plus an additional kilowatt peak demand measured over a set time period. A high peak use during just one measured time period will generally cause a large increase in the total electricity bill. These demand charges can account for more than half of the entire electrical bill.

Attempts have been made in the past to devise and market automated systems for limiting peak demands of electrical loads. These systems have generally involved the use of large control boxes including three separate counter and comparator circuits for each significant digit of actual electrical loading and desired load settings. The control schemes have usually included dtl/ttl logic, generating considerable power and heat, adding to the size requirements for the control boxes. Large backup battery supplies have been necessary for emergency powering of the dtl/ttl logics previously employed.

SUMMARY OF THE INVENTION

This invention relates to an energy management apparatus comprising a comparator means for comparing a demand count, indicative of power consumption by a plurality of loads, with a set point count and for producing a load demand indication dependent upon said comparison including a multiple-digit scanned output demand counter receiving demand count pulses, a multiple-digit scanned output set point counter receiving set point pulses, means for synchronizing scanning of the digits of the counters by stopping digit scanning of a counter which falls behind in the digit scan cycle until the next scan cycle of the driving counter returns the counters to equally significant digits and load control means responsive to said load demand indication for controlling the application of power to loads of said plurality of loads.

It is an object of the present invention to provide an energy management apparatus and method employing multiplexed digital comparator operation reducing the number of comparator circuits necessary in the system.

It is another object of the present invention to provide such an apparatus and method in which the feedback from the controlled loads is not obtained from the loads themselves.

Further objects and advantages of the present invention shall be apparent from the following detailed description and accompanying figures.

BRIEF DESCRIPTION OF THE DRAWINGS

FIG. 1 is a block diagram of a basic energy management apparatus according to the present invention.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now in particular to FIG. 1, there is shown a block diagram of a basic system according to the present invention. As shown in FIG. 1, a timer circuit 4 receives a power line reference signal of 60 hertz from which it generates various frequencies of pulses according to standard pulse generating methods.

A demand count 322 is coupled directly to a comparator circuit 1 from the watt meter demand apparatus of a user of electricity such as a factory or office building, etc. The demand count is in the form of a certain number of pulses over a selected period of time. For example, the pulse count received, although varying considerably, might be on the average 570 counts in 30 minutes. This 30 minute interval could be defined as a demand period. There is a set point input 323 to the timer circuit 4 which keys the timer to produce a desired number of pulses to define an upper limit for power usage for a demand period, for example 600 pulses in 30 minutes. This set point command to the timer circuit 4 may be manually set, but in the system described it is obtained from the floating set point circuit 2, as shall be described hereinafter. A percentage of the set point is selected as an input to timer circuit 4 to establish a desired lower limit for the demand count. For example, this low limit percentage might be selected between 90 percent and 99 percent of the set point. At 90 percent, the low limit would be a count of 540.

Using the exemplary pulse counts above, the set point count of 600 and low limit count of 540 are coupled on input 325 to the comparator circuit 1. Comparator 1 therefore receives both the upper and lower desired limit counts and the demand count indicative of the actual power consumption. The timer circuit 4 also produces, at the end of a demand period, a pulse on line 326 which keys the comparator to recognize the end of the demand period.

The comparator circuit 1 constantly scans the three significant digits of the counts from inputs 322 and 325 which, together with the resultant demand condition, are provided for display on output lines 327 and 328, respectively. The digit scanning synchronization within the comparator and as provided at 329 enables the use of a single comparator and sequentially scanned counters rather than three counter and comparator circuits, one for each significant digit. This results in a considerable cost and space savings in the assembly of the apparatus.

The counts for the set point, demand and low limit are displayed by display circuitry 5. The demand condition is also displayed; that is, if the demand is greater than the set point, between the low limit and set points in a "dead band" or permissible range, or below the low limit count.

This demand condition is also coupled on line 330 to a sequencer circuit 3. The current demand condition from the comparator is constantly fed to the sequencer, and when a load update command is received on line 331, the sequencer circuit 3 turns off a load if the demand count exceeds the set point, advances the loads sequentially in any event even if the demand count is in the permissible range, and turns a load on if the demand count is below the low limit. This action by the sequencer circuit 3 may be overridden by a preset maximum and minimum number-of-loads-off command programmed as shown at 332 such as by thumbwheel switches. Sequencer operation may also be affected by an external sequencer override command on line 333 as shall be discussed more particularly hereinafter. The sequencer circuit 3 continuously receives the demand condition on line 330 and, for example, every three or five minutes receives a load update command on line 331. At that time a line reference 60 hertz signal from line 334 is shaped and utilized to sequentially check the status of each of the controlled electrical loads and provide a turn off or turn on signal as necessary.

The sequencer circuit is, in the embodiment shown, addressing eight loads. The sequencer advances through these loads, in order, on each update command on line 331. When a load update command is received, the sequencer circuit provides a turn on signal on load control output 336 to the load it is addressing, and then the sequencer advances to the next load. The next load and subsequent loads are checked by the sequencer circuit through input lines 335 to determine if these are loads currently controlled by the sequencer. The sequencer will turn off the number of loads which it had turned off on the previous load update command plus or minus one load if the appropriate demand condition has been received on line 330. The position in the sequence is available as an output on line 337 from the sequencer to identify the position in the sequence at any given time.

In the presently disclosed apparatus, the set point is selected by floating set point circuitry which provides long term integration of the movement of the actual demand count. A one-tenth of one percent adjustment per demand period is provided by the floating set point circuitry 2. The end of the demand period is discerned by the floating set point circuitry by the signal on line 338 from the timer which also feeds the comparator circuit 1. The initial set point is determined by the user of the apparatus and input to the floating set point circuit 2 on line 339. The set point generated by the floating set point circuit is coupled to the display 5 on line 340. The demand count is also coupled to the floating set point circuit 2 on line 341 and this demand count is compared to the existing set point retained within the set point circuit 2 at the end of each demand period as keyed on line 338. At the end of a demand period, one-tenth of one percent of the amount by which the demand count exceeds or is less than the set point count is added to or subtracted from the set point, respectively. This comparison between the demand count and the existing set point is synchronized by digit scan synch on line 342, with the resulting set point digits being synchronized on line 340 for the display circuit 5.

The timer circuitry 4 is essentially standard pulse-generating circuitry for generating relatively even-spaced pulses in the desired amount in a specified period of time. Such pulse generating techniques are well within the state of the art. Similarly, the display 5, an LED display, is not disclosed in detail since it is also within the state of the art. A brief mention will be made hereinafter as to the synchronization of the display digits with the digit scanning of the comparator. The circuitry for the comparator, floating set point and sequencer circuits shall now be disclosed in further detail.

Figure 2A:
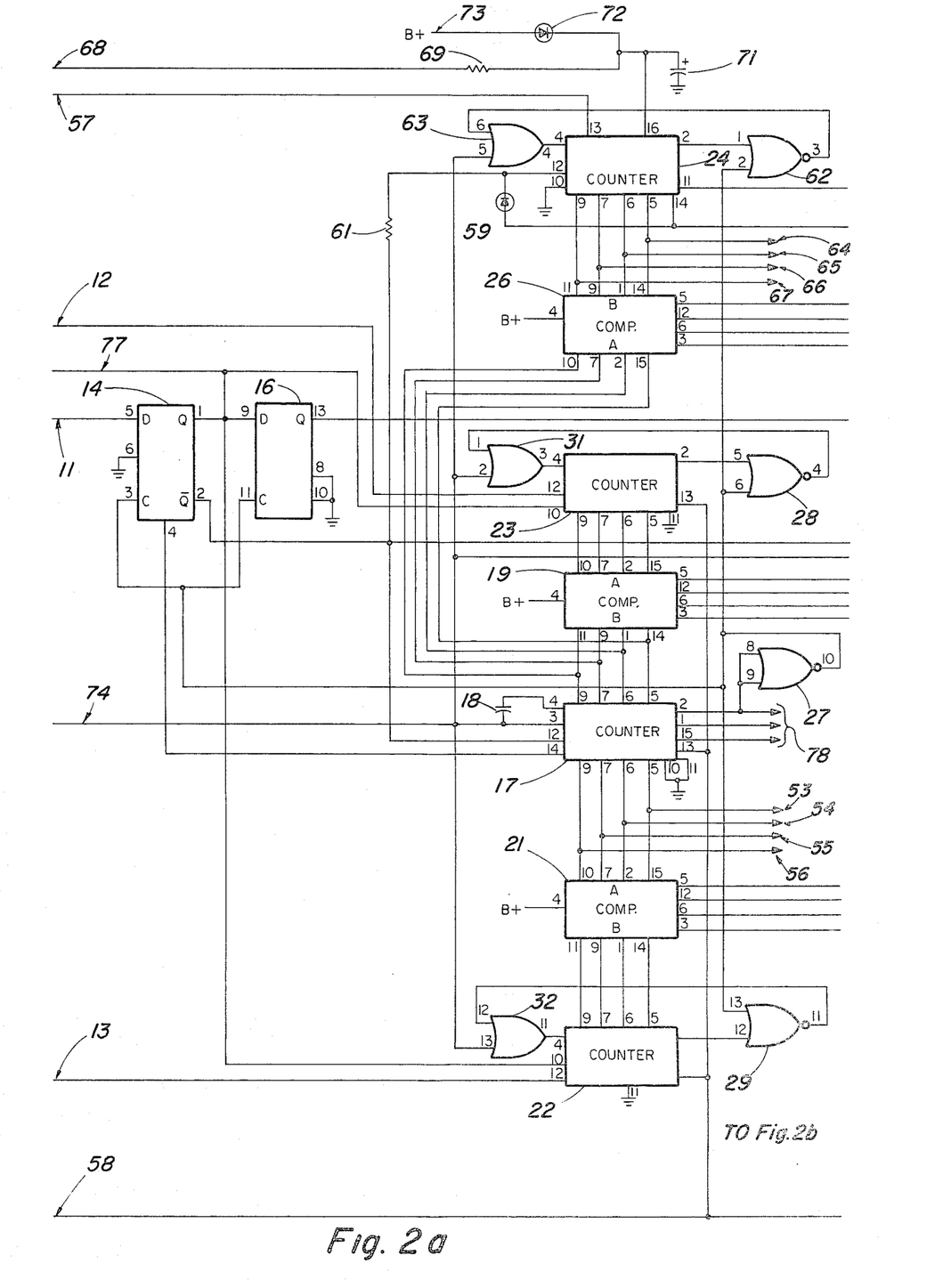
FIG. 2 is a detailed circuit diagram of the comparator of FIG. 1.
Figure 2B:
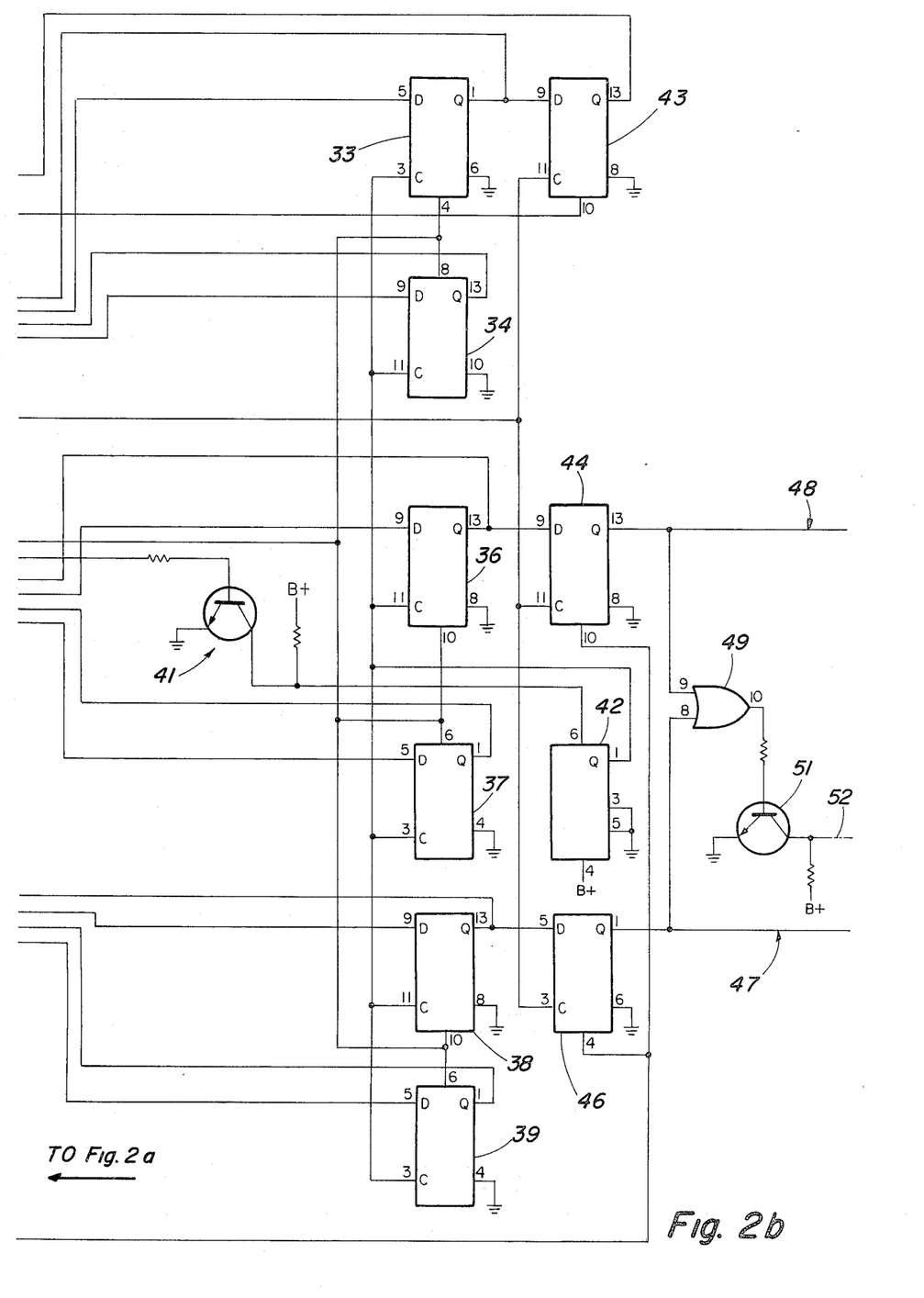

At input 11 to the comparator circuitry in FIG. 2, is the demand count of power being utilized by the electrical system. In the present exemplary embodiment, a number of pulses from the watt meter demand device for incoming power gives a demand count in the range between 0 and 999 pulses during a demand period. A demand period may be, for example, 15, 30 or 60 minutes. Therefore, an indication of energy utilized in the system is obtained by counting the demand pulses from line 11 over a particular time interval.

At input 12 is the count input for the set point counter which receives regular pulses at an appropriate rate from the timer board to total a number of pulses equaling the set point count in a demand period. These pulses are the desired upper limit for the demand count, with demand counts exceeding the set point counts resulting in corrective action by the circuitry. Input 13 is a low limit pulse input for a low limit counter and is preselected in a range of 90 to 99% of the set point count. The decrease of the demand count below the low level count also results in corrective action by the circuitry.

Referring back to the demand count input at 11, it is coupled to the data input of type D flip-flop 14. Type D flip-flop 14 and type D flip-flop 16 preferably comprise a dual type D flip-flop IC such as a Motorola MC 14013. Flip-flop 14 is clocked from a digit-scan output of a three digit BCD counter operating at a rate of about two thousand kilohertz. Therefore, with the arrival of a (somewhat longer) data pulse, there will be a coincidence with a clock pulse and the Q output of flip-flop 14 will go high. This high output is coupled to the data input of flip-flop 16 on the next digit-scan-dependent clock pulse, which is also coupled to the clock input of flip-flop 16. The high Q output of flip-flop 14 also serves to latch two of the three digit counters to be described hereinafter. These counters are latched on the Q output of flip-flop 14 and are therefore ready for a comparison in comparator circuits on the next digit scan occurring when the demand pulse is coupled to the Q output of flip-flop 16.

The Q output of flip-flop 16 clocks three other type D flip-flops 43, 44 and 46 for holding the output readings of the comparators as shall be described hereinafter. The Q̄ output of flip-flop 14 is connected to the clock input of a three digit BCD counter 17 such as a Motorola MC14553. An external capacitor 18 such as a 0.001 microfarad capacitor is coupled across the terminals of an on-chip oscillator to provide the digit scanning clock for the multiplexed digit selection of the counter. The counter has an internal ones, tens and hundreds portion and is capable of counting from 0 to 999. A binary coded decimal indication of each of these decimal digits is coupled to each comparator 19 and 21 in sequence at the rate determined by the on-chip oscillator mentioned above. Pins 2, 1 and 15 of counter 17 are indicative respectively of the least significant, next significant and most significant decimal digits being scanned through the operation of the on-chip oscillator. These outputs are normally high and go low sequentially as the digits are scanned, a low output indicating that the particular digit corresponding to that low output is at that moment being scanned.

Pin 11 is a clock disable input which stops the input of clock pulses at pin 12, and pin 10 is a latch enable input operable to latch the count in the counter such as for a comparison operation. In counter 17, both of these pins are grounded. Pin 14 is an overflow output, going high when the count in the counter exceeds 999. This output is coupled to the reset of flip-flop 14 preventing the additional input of demand count pulses through flip-flop 14, thereby preventing erroneous comparisons of additional counts in counter 17.

Counters 22, 23 and 24 are of the same integrated circuit type as counter 17, similar pins shown being for the above described functions. Counter 22 counts the low limit pulses from the timer board; counter 23 counts the set point pulses from the timer board; and counter 24 keeps a continuous record of the highest attained demand count over a period of time exceeding the demand period such as one day until manually reset.

The BCD output of counter 17 is coupled to 4-bit magnitude comparators 19 and 21. These comparators are preferably Motorola type MC14585 integrated circuits, as is comparator 26. Comparator 19 compares the demand count of counter 17 against the set point count in counter 23, and comparator 21 compares the demand count from counter 17 with the low limit count of counter 22. The counters are synchronized, as shall be described below, so that least significant, next significant and most significant digit comparisons are obtained in sequence from each counter at the appropriate comparator.

Set point count input 12 is coupled to the clock input of counter 23. This counter counts the set point pulses from the timer board, which during deadband or midband operation of this system are at a faster rate than the demand count pulses. Counter 23 also has the four BCD output lines coupled to comparator 19. Counter 22 receives timer board clock pulses at a preset rate determinative of a low limit for power demand. These pulses are fed from input 13 to the clock input of counter 22. During deadband operation of the power system, the count maintained at counter 22 is less than the demand count on counter 17. Counter 22 also has its four BCD outputs connected to comparator 21.

The two counters 22 and 23 for low limit and set point counts, respectively, have their three significant digit scanning oscillations synchronized with those established by demand count counter 17. At the beginning of each digit scan in counter 17, on the first scan pulse from the on-chip oscillator, pin 2 goes low indicating the scan of the first significant digit. This low is inverted by invertor 27 with the high output of invertor 27 being coupled to NOR gates 28 and 29 associated with counters 23 and 22, respectively. The other input to NOR gate 28 is from the least significant digit scan output of counter 23, and the other input to NOR gate 29 is from the least significant digit scan output of counter 22.

The output of NOR gate 28 is one input to an OR gate 31 whose output is coupled to the digit scan input of counter 23. The output of NOR gate 29 is coupled to the input of an OR gate 32 whose output is coupled to the scan input of counter 22. The other input to each OR gate 31 and 32 is from the scan oscillator of counter 17. A low input to one of the OR gates such as 31 from the output of NOR gate 28 permits the passage of scan oscillator pulses being generated at counter 17 into the scan oscillator input of counter 23. Thus, the scan of counters 23 and 22 is driven directly by the oscillator of counter 17. However, if a condition arises where, for example, counter 23 becomes out of synch in the digit scan cycle with counter 17, this situation must be quickly corrected so that digits of different significance are not compared in the comparators. In order to stop scan pulses through OR gate 31, the input to the OR gate from NOR gate 28 must go high. In practice, since the oscillator on chip 17 is driving the scans of the other two counters, it can only get ahead of the scan pulses at the other counters rather than behind. Therefore the NOR gates such as 28 recognize a condition where counter 23 is scanning the least significant digit with a low output from pin 2 of the counter providing a low input to NOR gate 28.

If the least significant digit output of counter 17 is at anything other than the least significant digit at this time, the output of pin 2 on chip 17 will be high, the output of inverter 27 low, and thus there are two low inputs to NOR gate 28 driving the output of OR gate 31 high and blocking further scan oscillator pulses from entering at pin 4 on counter 23. A similar phenomenon would occur at counter 22 if pin 2 of counter 22 were low at a time when counter 17 was scanning something other than the least significant digit. The condition of blockage of scan oscillator pulses to either counter 23 or 22, if they become out of synch with counter 17, persist until counter 17 again scans the least significant digit sending pin 2 of counter 17 low once again. Meanwhile, the driven counter which was out of synch as to digit scan has been frozen with pin 2 low and is again free to receive scan oscillator pulses once counter 17 scans the least significant digit. At this point the low output at pin 2 of chip 17 creates a high input to, for example, NOR gate 28 whose output goes low enabling scan oscillator pulses to be passed through OR gate 31 once again.

Therefore, comparator 19 receives sequentially the least, next and most significant digits of the respective counts in counters 23 and 17 at the same time. Similarly, comparator 21 receives this synchronized digit information from counters 17 and 22. These counts are continuously being provided from the counters to the appropriate comparators, but the comparator results are only stored and acted upon by subsequent circuitry at times when a demand count is received in the system. A demand count at the data input of flip-flop 14 sends the $\overline{Q}$ output of the flip-flop low. This low output from $\overline{Q}$ is coupled to either the set or reset pin of each of flip-flops 33, 34, 36, 37, 38 and 39. Flip-flops 33, 36 and 38 are reset while flip-flops 34, 37 and 39 are set. The set flip-flops have a high Q output while the reset flip-flops have a low Q output. The $\overline{Q}$ outputs of these flip-flops are not utilized.

The scan oscillator pulses from pin 3 of counter 17 are coupled to a pulse shaping network indicated at 41 which sets a flip-flop 42 on each scan oscillator pulse. Flip-flop 42 serves as a buffer and its Q output clocks flip-flops 33, 34, 36, 37, 38 and 39. These flip-flops as well as 42, 43, 44 and 46 are type D flip-flops.

Flip-flops 33, 34, 36, 37, 38 and 39 are therefore clocked by scan oscillator pulses from chip 17 acting through buffer 42. The data inputs for flip-flops 36–39 are from two of the three comparator outputs from each comparator 19 and 21. Therefore, on each pulse of the scan oscillator from chip 17 resulting in a subsequent significant digit being compared in the comparators, an input from one of the comparators is received at each flip-flop 36–39 and an output is obtained on the Q output of each flip-flop since a clock signal is received from buffer 42 at this time.

As an example, in the comparison between the demand count from chip 17 and the set point count of chip 23, the set point count shall be designated as A and demand count shall be designated as B for comparator 19. The A-greater-than-B input at pin 4 is tied to B+ and held high while the A-less-than-B input at pin 5 and the A=B input at pin 6 are obtained from the Q outputs of flip-flops 36 and 37 respectively.

In the initial condition, $\overline{Q}$ of flip-flop 14 sets flip-flop 37 and also resets flip-flop 36. Therefore the Q output of flip-flop 36 is low providing a low input to pin 5 of comparator 19. Also, the Q output of flip-flop 37 is high holding pin 6 of comparator 19 high. On each scan oscillator pulse the next significant digit will be fed in BCD form from each counter 23 and 17 to comparator 19 while at the same time flip-flops 36 and 37 are clocked to receive data inputs. The data input of flip-flop 36 goes high if the comparator output at pin 12 goes high, indicating that A is less than B. The data input to flip-flop 37 at pin 5 goes high if the comparator output at pin 3 goes high, indicating that A=B. So long as the most significant digit, or the third comparison of the three comparisons being made, from each counter is such that A is greater than B or A is less than B, the prior condition outputs at pins 3 and 12 are irrelevant. In case the most significant digit is equal from the two counters, the previous condition will determine the output from the comparator 19. That is, if the middle significant digit had been such that A was greater than B both outputs from pins 12 and 3 of chip 19 would have been low and these low outputs would have been coupled to the data inputs of flip-flops 36 and 37. Whatever the previous condition input to pins 5 and 6, that condition is retained by the comparator if the next comparison determines that the two compared digits are equal. Therefore, an A greater than B or an A less than B result from the least significant digit would be carried between chip 19 and flip-flops 36 and 37 for the next two significant digits comparisons and retained as the result if the two more-significant digits are equal.

If, after the three digits have been compared, the result from pin 12 of comparator 19 is high, indicating that A is less than B, the Q output of flip-flop 36 is high and this high is coupled to the data input of flip-flop 44. Flip-flops 38 and 39 cooperate with comparator 21 in the same fashion as described above for flip-flops 36 and 37 and comparator 19 and therefore shall not be described in detail. However, if the result of the comparison between demand counter 17 and low limit counter 22 is such that A (demand count) is less than B (low limit count), the output of pin 12 of comparator 21 is high and this high level is coupled through the data input of flip-flop 38 to its Q output which is in turn coupled to the data input of flip-flop 46.

The clock pulses for flip-flops 44 and 46 are provided from the Q output of flip-flop 16 which is itself clocked from the least significant digit scan output from chip 17. In other words, one three digit scan cycle after that initiated by the demand count reaching flip-flop 14, the Q output of flip-flop 16 clocks flip-flops 44 and 46 to transfer the A-less-than-B data inputs at those flip-flops to the flip-flop 44 and 46 Q outputs. If the demand count was in fact lower than the low limit count, the Q output of flip-flop 46 goes high and a high level output is provided at line 47 for subsequent use in switching of the electrical loads of the system. If the demand count was in fact higher than the set point count, the Q output of flip-flop 44 goes high and it is in turn coupled to an output line 48 for subsequent use for load variation. The two above-mentioned Q outputs are also the two inputs to an OR gate 49, and if either out-of-limit condition has occurred, the high output from the OR gate turns on transistor 51 sending output line 52 low. However, if the demand count has been equal to or between that of the two other counters, both inputs to OR gate 49 are low and transistor 51 remains biased off and line 52 is high.

Output lines 53–56 from the outputs of counter 17 are coupled to an appropriate decoder and display to indicate the current count from the demand counter.

Referring now to the function of counter 24 and comparator 26, comparator 26 compares the counts from demand counter 17 and a "highest level" counter 24. Flip-flops 33 and 34 are operatively associated with comparator 26 in the same fashion as described above for the other two pairs of flip-flops 36–37 and 38–39. Counter 24 is reset at pin 13 from an input line 57 such as a manual reset. Generally, the demand count received at pin 12 of counter 24 from the $\overline{Q}$ output of flip-flop 14 will be retained in the counter for several demand periods such as over a period of 24 hours. An input line 58 provides the reset signal for pin 13 of the other three counters on a signal produced from the timer board at the end of each demand period as set forth above.

On the first demand period after the reset of counter 24, it counts along with demand counter 17, and comparator 26 has a high output at pin 3 indicating that A=B. In this case A designates the demand count and B designates the highest demand count from chip 24. During this first demand period the A-less-than-B output at pin 12 of comparator 26 is low providing a low data input to flip-flop 33. On each digit scan pulse this low is coupled to the data input of flip-flop 43 and at the end of each digit scan cycle the low at the data input to flip-flop 43 is coupled to its Q output and then back to a clock disable input to chip 24 at pin 11. As mentioned, the input to pin 11 stays low throughout the first demand period as the two counters count in unison.

After the first demand period, counter 17 is reset while counter 24 retains the count previously attained during the first demand period. During the second demand period, the comparator 26, at the end of each scan cycle, has a high at pin 12 indicating that A (demand count) is less than B (highest attained demand count), and this high is coupled through flip-flops 33 and 43 to the clock disable pin 11 of counter 24. Therefore the count in counter 24 holds at the previously highest attained count from the first demand period. Whenever, in the second or subsequent demand period, the count at counter 17 equals the count in counter 24, the comparator output on line 12 will go low and at the end of the scan cycle, the clock disable pin 11 of counter 24 will go low and counter 24 will count the balance of the demand pulses received during such demand period. Thus counter 24 will only count if its previous count is not higher than the current count in demand counter 17 for a given time period. As can be seen also, as soon as the count in demand counter 17 equals the count in counter 24, counter 24 is enabled to receive clock pulses on the next demand count so that it does not gain or miss a pulse in its count.

If highest attained demand counter 24 exceeds a count of 999, overflow pin 14 goes high resetting flip-flop 43 and holding the clock input at pin 12 high through diode 59. A resistor 61 such as 100 Kohms isolates this high level from the clock pulses being fed to counter 17.

A NOR gate 62 and an OR gate 63 are coupled between pins 2 and 4 of counter 24 in the same manner and for the same synchronization purposes as the pairs of gates described above in regard to the other three counters. The output pins of highest attained count chip 24 are also connected to output lines 64 through 67 which are coupled to an appropriate decoder and digital display to show the highest attained count of counter 24.

Input power supply line 68 couples B+ to counter 24 through resistor 69 at pin 16. Input line 68 is preferably coupled from a battery such as a 1.2 volt battery and resistor 69 may be a one meg ohm resistor. During normal operation of the apparatus, standard B+ from input line 73 is coupled through diode 72 and filtered by 0.1 microfarad capacitor 71 to provide the B+ for counter 24. In the event of a power failure, the highest attained demand count will be retained in the counter by the operation of the battery through input line 68 even if the B+ supply at line 73 fails. In addition, the B+ on line 73 charges the battery during normal operation. There will, therefore, be retained a permanent record of the highest attained demand count even in the event of a power failure.

Figure 3A:
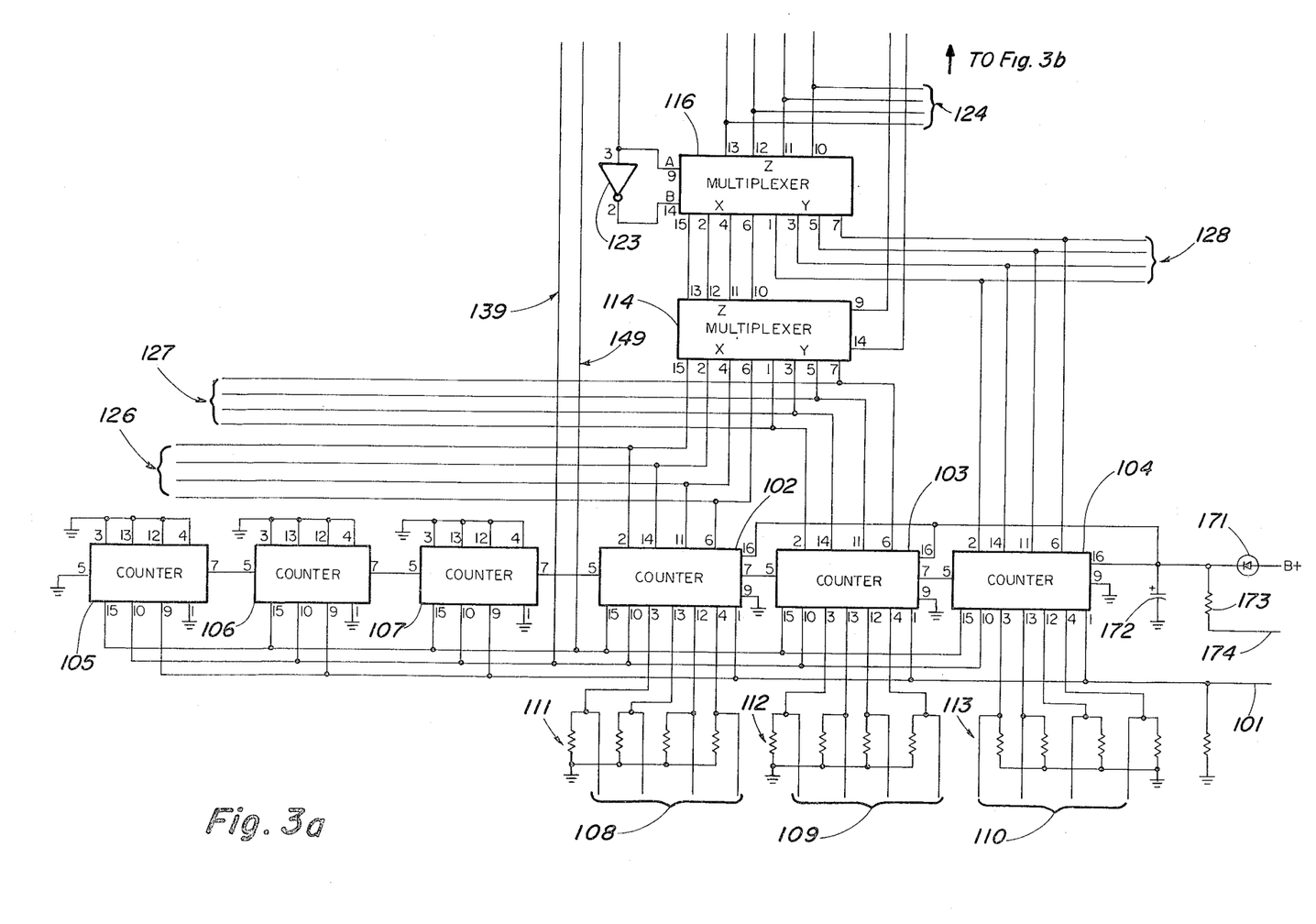
FIG. 3 is a detailed circuit diagram of the floating set point circuit of FIG. 1.
Figure 3B:
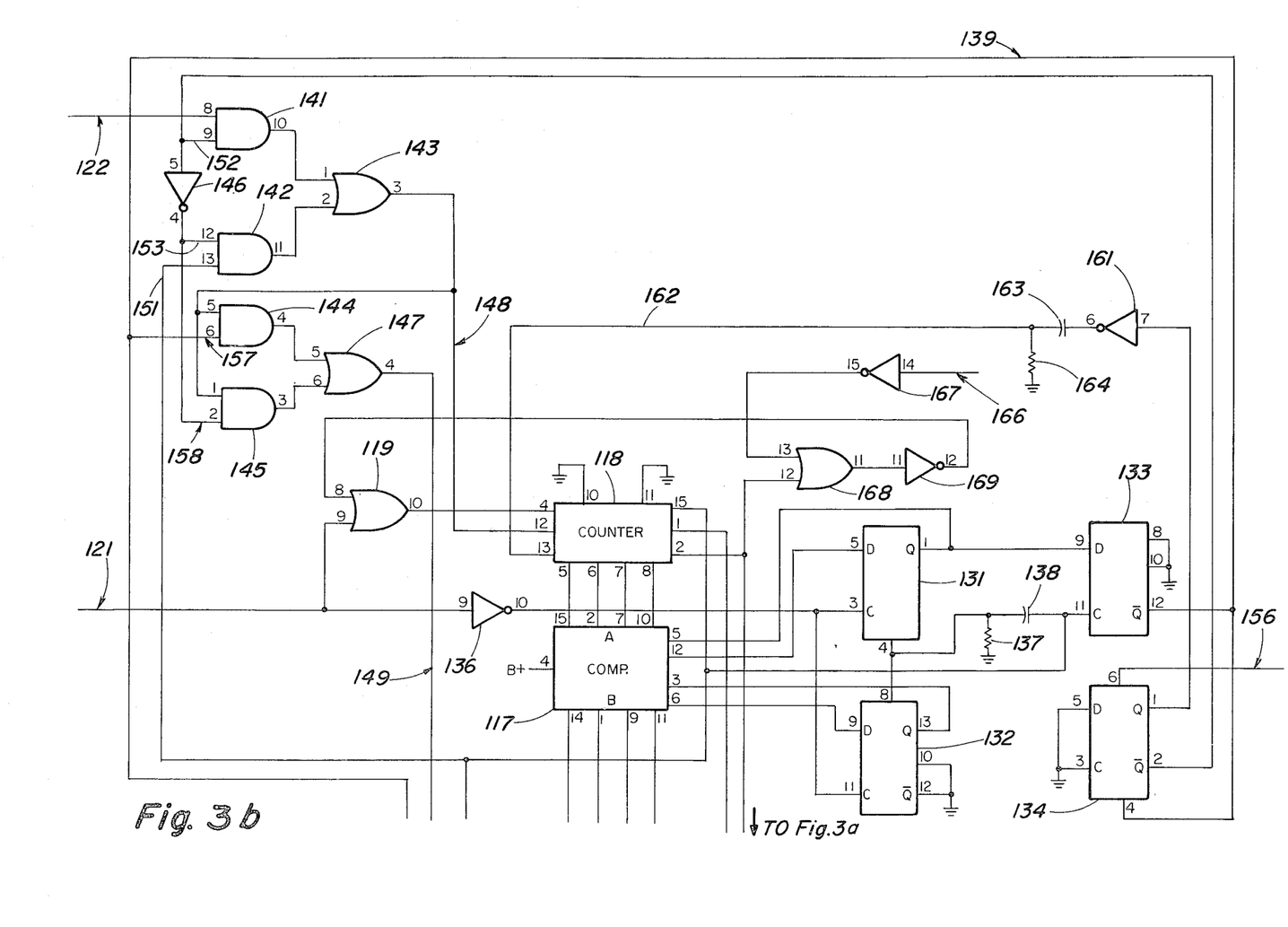

Referring now to FIG. 3, there is shown the floating set point circuitry for providing gradual adjustment of the set point and low limit point of the system over a period of time depending upon the actual demand pulse count. At the beginning of a series of demand periods, an input line 101 is taken manually high, which presets BCD up/down counters 102, 103 and 104 and also resets BCD up/down counters 105, 106 and 107. Counters 102–107 are preferably Motorola type MC14510. Thumb wheel (not shown) settings are coupled through BCD input line groups 108, 109 and 110 denoting units, tens and hundreds respectively. These three input line groups are coupled to the presetable inputs of counters 102, 103 and 104 respectively and these inputs are entered into the respective counters upon the arrival of the high signal from line 101. Loading resistors are provided in parallel in each of the presettable inputs to counters 102–104 as shown at 111, 112 and 113 respectively. In the absence of the circuitry of FIG. 3, a fixed set point could be provided directly through the timer board to the comparator circuitry from the thumb wheel settings if no adjustment of set point based upon actual demand is desired or necessary in the particular system.

The Q outputs of counters 102–104 may be moved up or down from the preset position as shall be described hereinafter, dependent upon the demand count from the system. The outputs from the units counter 102 and tens counter 103 are coupled to multiplexer 114, such as a Motorola MC14519. The selected Z output of multiplexer 114 is multiplexed with the hundreds output from counter 104 by multiplexer 116, which is the same type as multiplexer 114. A Motorola MC14553 counter 118 provides one set of inputs to a Motorola MC14585 comparator 117, with the other input to the comparator being from the output of multiplexer 116, cooperating in a similar fashion to the counter and comparator combinations described above in the comparator circuitry. The scan pulse input at pin 4 for counter 118 is coupled through OR gate 119 from input line 121 which is connected to line 74 of the scan pulse generator of counter 17 of the comparator circuit (FIG. 2). Thus counter 118 is synchronized as to digit scanning with the counters of the comparator circuit.

Input line 122 carries the demand count synchronized with the digit scan of the comparator circuitry from line 77 (FIG. 2). This demand count is coupled through gate circuitry to be described hereinafter to pin 12, the clock input of counter 118. As described above in the comparator circuitry in regard to the other MC14553 counters, the three significant digits are sequentially presented in BCD form on the Q outputs of counter 118 as the digits are scanned through the action of the scanning pulses at pin 4. The scanned digit, least significant, next significant, and most significant is indicated by a low output on pins 2, 1 and 15, as these digits are scanned, respectively.

At the same time, the multiplexers 114 and 116 are activiated to couple the X input to the Z output when pin 9 goes high, and couple the Y input to the Z output when pin 14 goes high. Therefore, when counter 118 is scanning the least significant digit, pin 2 is low and this low is coupled to pin 14 of multiplexer 114. At the same time, counter 118 pin 1 is high, and this high output is coupled to pin 9 of multiplexer 114. Therefore, the units input from counter 102 is coupled through multiplexer 114 to the X input of multiplexer 116. At this time, the most significant digit output at pin 15 of counter 118 is also high and this high output is coupled to the X control input at pin 9 of multiplexer 116. This same high is inverted by inverter 123 and provides a low input to the Y control input at pin 14 of multiplexer 116. Therefore, the units input to multiplexer 116 is coupled to its outputs and thence to comparator 117's B inputs. As can be seen, the illustrated connections from pins 2, 1 and 15 of counter 118 to the control inputs of multiplexers 114 and 116 insure that the appropriately significant digit from counters 102–104 is coupled to the B inputs of comparator 117 at the time that the corresponding significant digit is provided to the A inputs of the comparator from counter 118. The B inputs derived from the multiplexers and the counters 102–104 are also coupled to a set of outputs 124 for multiplexed display purposes after appropriate decoding. Similarly the individual outputs of counters 102, 103 and 104 are coupled to sets of output lines 126, 127 and 128, respectively.

Type D flip-flops 131–134 cooperate with the comparator cascading inputs and outputs at pins 5, 12, 3 and 6 of comparator 117 in essentially the same fashion as described above in regard to the flip-flops of the comparator circuit. The scan pulses from input line 121 are inverted by invertor 136 and coupled to the clock inputs of flip-flops 131 and 132. Therefore, after the comparison is made in comparator 117 the A-less-than-B output at pin 12 of the comparator and the A=B output at pin 3 of the comparator are coupled to the data inputs of flip-flops 131 and 132, respectively, and are clocked through the flip-flops to the Q outputs. Therefore, if A is less than B in the least significant digit, the A-less-s-than-B output at pin 12 goes high, the data input to flip-flop 131 is high, the clock pulse arrives from inverter 136 and the Q output of flip-flop 131 goes high coupling a high input back to pin 5 of comparator 117. If A were not less than B, a low would be coupled back to pin 5 of comparator 117 in similar fashion. The same result occurs from the A=B output at pin 3 of comparator 117 through flip-flop 132 and back to the A=B input at pin 6 of comparator 117. After the comparison of the most significant digit, the conditions at output pins 12 and 3 of comparator 117 are indicative of the overall result of the comparison of the 3 digits.

After the most significant digit has been compared, the most significant digit output at pin 15 of counter 118 returns high after being low and supplies a clock pulse to flip-flop 133. This pulse is also shaped by capacitor 138, such as a 0.0047 microfarad capacitor and resistor 137, 100 Kohms, to reset flip-flop 131, returning the A-less-than-B input to comparator 117 low. This pulse from capacitor 138 and resistor 137 is also coupled to the set input of flip-flop 132, whose Q output goes high bringing the A=B input into the comparator high, in preparation for the next comparison.

With flip-flop 133 clocked from pin 15 of counter 118 at the end of a 3-digit scan operation, the overall comparison result is coupled through flip-flop 133. At the end of each 3 digit comparison, therefore, the inverse of the data input appears at the $\overline{Q}$ output of flip-flop 133 on line 139. Line 139 is high if the demand count of counter 118 is greater than or equal to the count received from multiplexer 116. Line 139 is low if the demand count of counter 118 is less than the count from multiplexer 116. Line 139 is connected to each of the up/down inputs of counters 102 through 107 at pin 10; and, if the carry-in input at pin 5 of a given one of these counters is low, a low on line 139 will enable a count down, and a high on line 139 will enable a count up in that counter.

The demand count input on line 122 is one input to AND gate 141 and the other input to AND gate 141 is from the $\overline{Q}$ output of flip-flop 134. As previously mentioned, this output of the flip-flop will be normally low if A (demand) is less than B (set point) after a three digit scan operation. This indicates that the demand count has not reached the set point at that time during the demand period. The AND gates 141, 142, 144 and 145, invertor 146, and OR gates 143 and 147 cooperate to provide a count on line 148 to counter 118 and on line 149 to advance the counters 102-107.

Through the functioning of the circuit to be described hereinafter, the reset of counter 118 after a demand period occurs only at a time when counter 118 and the output of multiplexer 116 are equal. Therefore, as an initial condition, the $\overline{Q}$ output of flip-flop 134 is and remains high throughout the demand period since flip-flop 134 does not receive a set pulse on line 156 from the timer circuitry until the end of the demand period. This high $\overline{Q}$ output is coupled to input 152 of AND gate 141, permitting passage of the demand counts from line 122 through AND gate 141. AND gate 142 receives the inverse of this $\overline{Q}$ output through inverter 146 at input 153. The other input 151 to AND gate 142 is from the most-significant-digit scan output of counter 118, and when the output of invertor 146 is high this rapid scan count is coupled through AND gate 142. At this time input 152 to AND gate 141 is low, preventing the passage of demand counts through AND gate 141. OR gate 143 passes whichever AND gate output, that of gate 141 or gate 142, is operative. The output from the OR gate is coupled to the clock input of counter 118.

During a normal demand period, while the count in counter 118 is increasing but less than the setting of the set point, demand counts are coupled through AND gate 141 and OR gate 143 in normal fashion. If the demand period ends with the demand count in counter 118 less than the set point, the most-significant-digit scan output from pin 15 of counter 118 will be coupled through AND gate 142 to catch counter 118 up to the set point count. At the same time a similar count is sent through line 149 to the clock inputs of the counters 102-107, as shall be described more particularly hereinafter. If, during a demand period, the demand count equals the set point count, the demand count will continue to be coupled through line 148 to counter 118, but at the same time the demand count will be coupled through line 149 to the set point counters.

In the situation where the demand count is less than the set point at the end of the demand period, line 139 to the reset pin 4 of flip-flop 134 will be low and a high pulse on line 156 setting flip-flop 134 sends the $\overline{Q}$ output of the flip-flop low since no reset high is present at this time. With $\overline{Q}$ of flip-flop 134 low, input 152 to AND gate 141 is low blocking the demand count pulses. Through inverter 146, input 153 to AND gate 142 is high, permitting the passage of the digit-scan rate pulses from the most significant digit output of counter 118. These pulses are in the frequency range of about 2 khz, and these high frequency pulses are coupled through OR gate 143 to the clock input of counter 118. Counter 118 quickly catches up in count to the set point, at which time line 139 goes high resetting flip-flop 134 and bringing $\overline{Q}$ of the flip-flop high once again, blocking further coupling of the high frequency scan pulses. During this time input 157 to AND gate 144 has been low since it is connected to line 139. Input 158 to AND gate 145 has been high since it is coupled from input 153 of AND gate 142 which is enabled at this time to pass the high frequency pulses. Therefore, the high frequency pulses from the output of OR gate 143 are coupled through AND gate 145 and OR gate 147 to the clock inputs of counters 102-107 on line 149. For a clock pulse to register on the counters 102-107, two further conditions must be met beyond the existence of the clock pulse. First, the carry-in inputs at pin 5 must be low, and for the desired direction of the count, either up or down, the up/down input at pin 10 of each counter must be high for an up-count and low for a down-count. At the time the above mentioned clock pulses are arriving at counters 102-107, line 139 which is coupled to the up/down pins of these counters is low so that the counters will count down. Counter 105 has pin 5, the carry-in input, grounded so that as the high frequency counts are arriving to catch the demand counter up to the set point, counter 105 is counting these pulses. Once counter 105 counts to 10, its carry output goes low, from its normally high condition, permitting one count on counter 106. Thus it can be seen, that counters 102, 103 and 104, the presettable set point counters for units, tens and hundreds respectively, are only adjusted by each one thousand pulse difference in the counts. Thus counter 107 is a tenths counters, 106 a hundredths counter and 105 a thousandths counter.

If the demand counter 118 equals and then exceeds the set point count, it is necessary to clock counter 105 and its succeeding counters upward instead downward indicative of the fact that the actual load exceeded the set point load and an upward set point adjustment is necessary. In this condition where the demand count equals the set point before the end of a demand period, line 139 goes high at the time that A (demand count) equals B (set point). This will not affect the entry of demand counts through AND gate 141 and OR gate 143 to counter 118. However, input 157 to AND gate 144, connected to line 139, goes high permitting the coupling of the demand count pulses of OR gate 143 through AND gate 144 and OR gate 147 to the clock inputs of counters 102-107. At this time also line 139 being high will cause an up count to be entered in counter 105 and the succeeding counters if the appropriate carry-in low is obtained. It can be seen therefore that the counter 105 and its succeeding counters count along with counter 118 for any demand pulses in excess of the set point for the balance of the demand period.

At the end of such a demand period where the demand count exceeds the set point, the flip-flop 134 is receiving a reset high from line 139 at the time the positive pulse on line 156 to end a demand period arrives at the set input pin 6 of flip-flop 134. The high reset level maintains the $\overline{Q}$ output of the flip-flop high, but the Q output of the flip-flop goes momentarily high upon the arrival of the pulse on line 156 and then returns low after the pulse occurs. The transition from high to low at the Q output is inverted by inverter 161 and resets counter 118 on line 162. Capacitor 163 and resistor 164 as shown differentiate the output of inverter 161 so that the transition from high to low at the Q output of flip-flop 134 resets counter 118. In the case where the demand count was less than the set point at the end of the demand period, the end-demand pulse on line 156 sets flip-flop 134, bringing the Q output high, which does not cause a reset pulse to counter 118, and bringing the $\overline{Q}$ output low enabling the catch up count described above. When the demand counter 118 has caught up to the set point, line 139 goes high resetting flip-flop 134, returning $\overline{Q}$ high and bringing the Q output low from its previous high condition and at this time the counter 118 is reset. The end-demand period pulse on line 156 is the same as that on line 58 of the comparator (FIG. 2).

Line 166 is coupled from pin 2 of counter 17 (FIG. 2), the least significant digit scan output pin. Inverter 167, and OR gate 168, inverter 169 and OR gate 119 serve the same synchronization functions to keep counter 118 in synch with counter 17 (FIG. 2) as was described above in regard to counters 22, 23, and 24 (FIG. 2).

Diode 171 is coupled from the B+ supply and line 174 runs from a 1.2 volt battery, with diode 171, capacitor 172 and resistor 173 serving as a battery back-up power supply network as described above in regard to diode 72 etc. (FIG. 2).

Figure 4A:
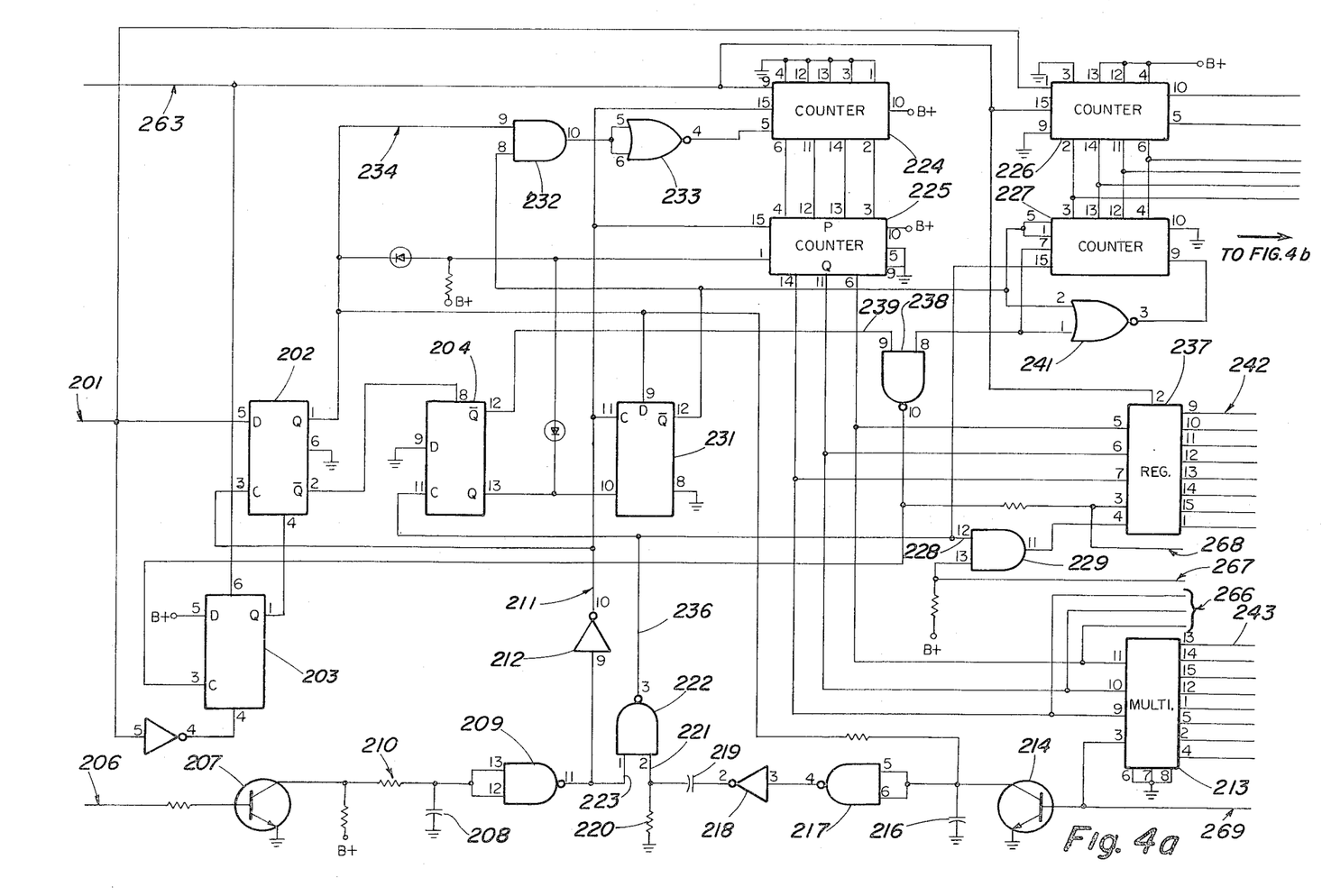
FIG. 4 is a detailed circuit diagram of the sequencer circuit of FIG. 1.
Figure 4B:
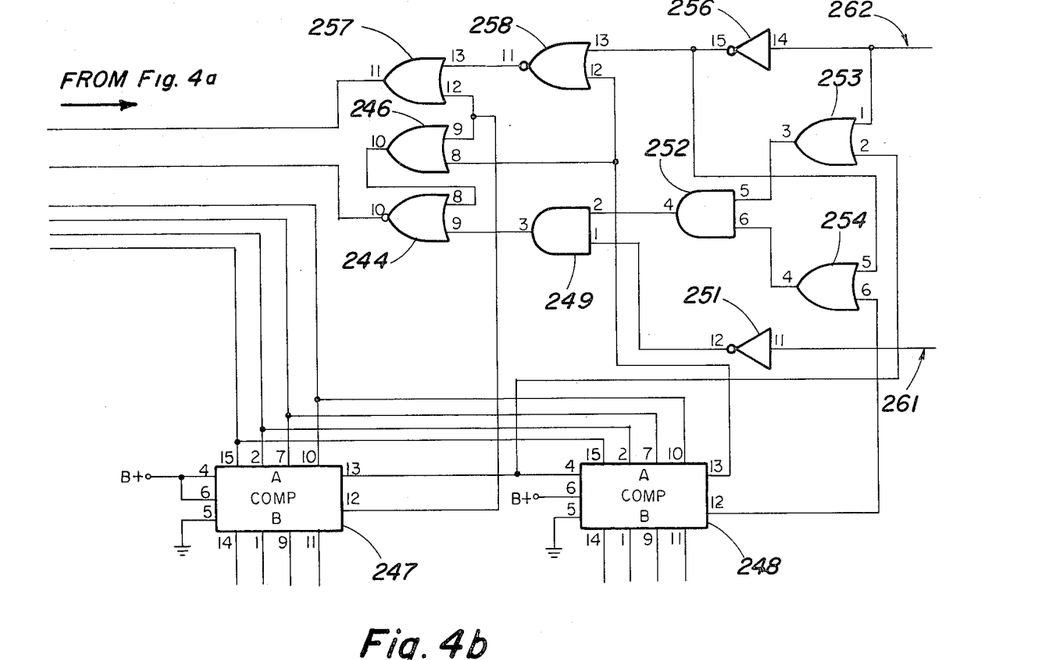

Referring now to FIG. 4, the sequencer of FIG. 1 is shown in detail. The sequencer responds to the load information from the comparator, maintaining the proper net number of off loads, and cycling the on and off loads. After a predetermined interval, an update command pulse is received on line 201 from the timer circuit to initiate sequencer operation. The update command pulses may be selected to arrive at intervals of, for example, three, five, ten or fifteen minutes. Generally an update period is somewhat less than an entire demand period.

The update pulse is a relatively wide pulse and arrives at the data input of flip-flop 202. Flip-flop 202, as well as flip-flops 203, 204 and 231 are type D flip-flops as on an MC14013. A 60 hz line signal is received at line 206 and coupled through transistor 207 and its associated resistances including 1 meg ohm resistor 210 and across capacitor 208 to obtain buffing and a ninety degree phase delay in a Schmitt trigger arrangement. Inverter 209 supplies on line 211 a clock input to flip-flop 202 which is 180° out of phase with the input 206 through the inversions including that of inverter 212 and also phase delayed 90°. Integrated circuit 213 is an RCA type CD 4051 multiplexer which provides at pin 3 one input (of the eight inputs) addressed by the address presented at pins 9, 10 and 11. For the moment assume that a sixty cycle signal in synch with 206 is obtained from pin 3 and inverted by transistor 214 when the Q output of flip-flop 202 is high. The 60 hz pulses are shaped and inverted again by capacitor 216 and inverter 217. A subsequent inversion occurs through inverter 218 and the resulting pulses are differentiated by capacitor 219, a 0.001 microfarad capacitor, and 1 meg ohm resistor 220.

Figure 6:
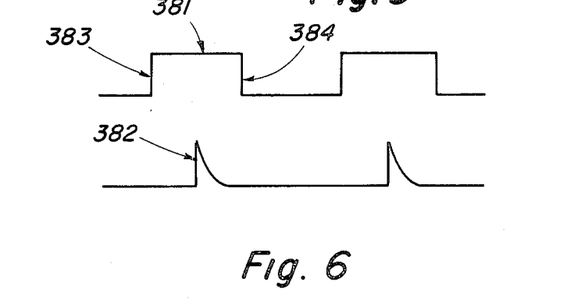
FIG. 6 is a waveform diagram of the pulses on lines 221 and 223 of the circuitry of FIG. 4.

The first pulse at 221, due to the rise on the collector of transistor 214 from 202 Q going high, occurs after 223 has gone low so that the output of NAND gate 222 stays high. Thereafter, during a sequence, when the signal from pin 3 of 213 goes from positive to negative, a positive pulse appears at the 221 input to NAND gate 222; and, as shown in FIG. 6, one of these pulses 382 occurs in the middle of a positive non-differentiated pulse 381 on 223 of NAND gate 222. Pulse 381 has a leading edge 383 and a trailing edge 384. The waveform on line 211 is, of course, the inverse of pulse 381 of FIG. 6.

Before an update command pulse is clocked into flip-flop 202, the Q output of this flip-flop is low and there is no bias supplied to the collector of transistor 214, and the present enable at pin 1 of counter 225 is low so that its inputs from counter 224 are not entered. Counters 224-227 are Motorola type MC14516. Also, at this time, there is no data input to flip-flop 231, and one input to AND gate 232 is low so that the output of NOR gate 233 is high, preventing counting by counter 224 since pin 5 of counter 224 is the carry-in pin, which must be low to permit counting.

With the arrival and persistence of an update command at the data input to flip-flop 202, when the next shaped 60 hz pulse arrives on line 211 to the clock input of flip-flop 202, the Q output of the flip-flop goes high. Since the Q output of flip-flop 204 has been high, the high Q output of flip-flop 202 permits the preset enable at pin 1 of counter 225 to go high, programming counter 225 to the count held in counter 224. Since the Q output of flip-flop 204 is high, flip-flop 231 is held in the reset condition. Also, with the high input on line 234 to AND gate 232, the carry-in input of counter 224 goes low and places counter 224 in a condition for subsequent counting.

The $\overline{Q}$ output of flip-flop 202 had been high, holding flip-flop 204 in a set condition. Now $\overline{Q}$ has gone low, placing flip-flop 204 in a condition to be able to be clocked from the output of NAND 222 on line 236.

The count position, or load sequence position, which had been held in counter 224 and is now coupled into counter 225 through the P inputs of counter 225 at pins 4, 12, 13 and 3, are coupled from Q outputs 1-3 at pins 6, 7 and 14 of counter 225 to the address inputs of eight bit addressable register 237, an RCA type CD 4099 and also to eight bit addressable multiplexer 213. Multiplexer 213 reads the load addressed and couples a signal associated with that load to pin 3. If the addressed load is a legitimate, or controllable, load, the next 60 hz load pulse from pin 3 will turn on transistor 214, which as described above now contains a positive voltage on its collector. If transistor 214 is turned on, ultimately a pulse is generated at the output of NAND gate 222 on line 236, with resulting circuit operation to be described hereinafter. If no pulse appears on line 236, the next 60 hz pulse on line 211 will not affect flip-flop 204, counter 224 or the biasing on transistor 214, but counters 224 and 225 do receive a clock pulse and advance one count. During this same time, the $\overline{Q}$ output of flip-flop 231 has been high so that counter 227 is programmed from counter 226 as to the loads-to-be-turned-off count.

Line 236 has been high since input 221 to NAND gate 222 has been low. In this condition there is no clock pulse to flip-flop 204, and the write command at pin 4 of register 237 is therefore high, and pin 4 must be low in order for register 237 to write. Also, until there is a change in line 236, no clock pulse is received by counter 227 at pin 15 to count down the number of off loads.

After the beginning of a count sequence on line 211, either after the first pulse, or a subsequent pulse, when the first legitimate load is addressed by multiplexer 213, line 236 goes low. This gives a write command to register 237 and the data input on pin 3 of register 237 is coupled to the load addressed at that time. The write command appears when line 236 has gone low, and therefore flip-flop 204 has not yet been clocked, so the $\overline{Q}$ output of flip-flop 204 is still low holding input 239 to NAND gate 238 low, which places a high at the data input to register 237 at the time the right command arrives. Therefore, for the addressed load in the exemplary eight load sequence at which counter 224 starts when the update command arrives, or at the load to which it has advanced before a controllable load had been addressed, is the first load to receive a command from register 237 and this command is an "on" command. From this point on, up to the number of off loads contained in counter 227, counter 225 will advance shutting off legitimate loads. Counter 224 will advance only one count before being disabled from further counting for each update command which is received. Thus the starting point in the sequence of loads advances one load per update command.

After the above-described write command, line 236 returns high after the passage of the pulse from transistor 214 and its associated circuitry. At this time flip-flop 204 is clocked and its Q output goes low and its $\overline{Q}$ output goes high since the data input to flip-flop 204 is grounded. The reset command is thus removed from flip-flop 231 enabling it to receive the next clock pulse from line 211 but not affecting the flip-flop at this time. Also the preset enable high is removed from counter 225 enabling it to count up beginning on the next pulse on line 211. The high $\overline{Q}$ output of flip-flop 204 at this time and subsequently provides a high input on line 239 to NAND gate 238. If there is an off loads count held in counter 227, its carryout output at pin 7 will be high and thus the other input to NAND gate 238 is high and its output is low enabling register 237 to write zeros when subsequent write commands are obtained at pin 4 of register 237.

The next pulse on line 211, before the occurrence of the next legitimate load low pulse on line 236, clocks counters 224 and 225. The pulse on line 211 also clocks flip-flop 231, its data input being held high still by the Q output of flip-flop 202. The resulting low $\overline{Q}$ output of flip-flop 231 operates through gate 232 and 233 to put a high on the carry-in input to counter 224, preventing further counting. The now low $\overline{Q}$ output of flip-flop 231 also removes the preset enable from counter 227 freeing this counter to count down, from the number of off loads it has received from counter 226 while preset, to a count of zero as legitimate loads are given off commands. The low $\overline{Q}$ output from flip-flop 231 is also connected to an input of NOR gate 241 permitting its control now by the carry-out condition of counter 227, which is coupled to the other input of the NOR gate. As long as there is a count in counter 227, the carry-out at pin 7 will be high and the reset at pin 9 from the output of NOR gate 241 will be low. As soon as the counter 227 has counted down to zero the counter will be held in the reset condition by the resulting high from the output of NOR gate 241. Counter 227 counts down due to the grounding of the up/down pin 10 of the counter as shown.

The circuit is now ready to write off commands (or no load commands) through register 237 as legitimate loads are recognized causing line 236 to pulse low. When line 236 pulses low it gives a write command to register 237 and, assuming there is a count in counter 227, a turn off or low command is coupled from the data input at pin 3 of register 237 to the appropriate load which is addressed by counter 225. When line 236 returns high after the legitimate load low going pulse, the clock to flip-flop 204 does not register since is has been previously clocked, and a clock input is received at counter 227 and counter 227 counts down one.

For each successive count on line 211 counter 225 counts up one, and if this pulse is followed by a pulse on line 236 indicating a legitimate load, register 237 issues a write command and counter 227 counts down. When the number of off loads required by counter 227 have been turned off, the carry-out of the counter will go low. This will be on the rise of the low going pulse from line 236 after the write command has already been given. As mentioned above, the low carry-out output on pin 7 of counter 227 causes the output of NOR gate 241 to go high, putting a reset command into counter 227 and holding the carry-out at pin 7 low. The output of NAND gate 238 now goes high clocking flip-flop 203. Since the data input of flip-flop 203 is held high, its Q output resets flip-flop 202. Flip-flop 202 can not be set once again until another update command is received at its data input. Therefore, flip-flop 202's Q output goes low on the reset disabling the counting of counter 224, placing a low at the data input to flip-flop 231, holding the preset enable of counter 225 low and removing the high from the collector of transistor 214. The $\overline{Q}$ output of flip-flop 202 is high, setting flip-flop 204 which resets flip-flop 231 at pin 10 setting the system for the next update command. A power-on reset pulse is provided on line 263 for the sequencer circuitry.

The count of loads to be turned off is carried in counter 226. This count is capable of being varied by one either up or down, on each demand update command. The counter 226 is clocked once for each update command, and if the carry-in input at pin 5 is low, the count will be entered. The count will be up if the up/down input at pin 10 is high, and the count will be down if pin 10 is low at the time of the clocking.

Comparators 247 and 248 are Motorola MC14585 comparators, in this instance connected in a non-cascaded arrangement. Comparator 247 receives along its lower, or B, inputs a manually preset minimum number of loads to be turned off at a given time. Comparator 248 receives a similar input as to the maximum number of loads to be allowed to be off at any time. These min and max loads off are compared with the actual number of loads off from the output of counter 226. The various gates feeding the up/down and carry-in inputs of counter 226 are operable to permit the in-balance and high lines from the comparator to raise, lower or leave the same the count in counter 226, within the limits prescribed by the preset min and max counts of comparators 247 and 248.

If, for some reason, the number of loads off is less than the minimum prescribed by the B input to comparator 247, the A less than B output at pin 12 will be high. If this is high, the output of OR gate 246 is high and the output of NOR gate 244 is low, permitting a count by counter 226. Also, the high on pin 12 of comparator 247 also places a high at an input to OR gate 257 and its output is high, giving an up command to the up/down input to counter 226 at pin 10. Therefore, if the number of loads turned off ever is less than the minimum setting, the command to counter 226 will always be to increase the number of loads by one for the particular interval in question.

If, on the other hand, the number of loads off exceeds the maximum set through comparator 248, then the A greater than B output of comparator 248 at pin 13 will be high. Unless the min and max inputs have been misset, the A less than B output at pin 12 of comparator 247 will be low (since normally if the number of loads off is greater than the maximum it will not be less than the minimum). In this normal situation, there will be a low input to each OR gate 257 and 246 from pin 12 of comparator 247. At the same time pin 13 of comparator 248 is high making the other input to OR gate 246 high and the output of OR gate 246 is therefore high, causing the output of NOR gate 244 to be low, permitting a count by counter 226. Also the high on pin 13 of comparator 248 is a high input to NOR gate 258 whose output is therefore low. Therefore, both inputs to OR gate 257 are low and its output is low causing a count down, reducing the number of loads off to or toward the maximum setting into comparator 248. As can be seen from the above discussion, the comparator 247 with the minimum number of loads off setting overrides the comparator 248 in the case that the minimum number of loads off should be set higher than the input to comparator 248 for the maximum number of loads off.

Assuming that for normal operation the number of loads off is not less than the minimum, pin 12 of comparator 247 will be low providing a low input to each OR gate 257 and 246. At the same time assuming normal operation, the number of loads off will not be greater than the maximum as determined by the inputs to comparator 248 and pin 13 of comparator 248 will be low. This low provides a low input to NOR gate 258 as well as a low input for the other input to OR gate 246. That means that during normal operation one of the inputs to NOR 244 will always be low.

If the condition from the comparator board is such that the demand count exceeds the set point, there will be a low input on the in balance line 261 (from comparator line 52 of FIG. 2) and a high input on the high line 262 (from comparator line 48 of the FIG. 2). For normal operation, the low on line 261 and high on line 262 will provide a low at one input to OR gate 254, a high at the output of OR gate 253, and high at an input to AND gate 252, a high at an input to AND gate 249, a low at an input to NOR gate 258, a high at an input to OR gate 257, and a high at the up/down input pin 10 of counter 226. Therefore, if a count is enabled, by the carry-in input at pin 5, the count will be up. In order for there to be a count up, the count must not be equal to the maximum set through comparator 248. If the maximum has not already been reached, then the A less than B output at pin 6 will be high, providing a high input to OR gate 254 which will therefore have a high output. This high output provides the second high input to AND gate 252 whose output goes high providing a second high input to AND gate 249 whose output goes high providing a high input to NOR gate 244 whose output goes low enabling a count by counter 226, since a low at pin 5 enables the carry-in.

In the situation in which the demand count was within the range provided between the set point and low limit point on the comparator board, the in balance line 261 will be high and the high line 262 will be low. This combination provides a high at one input to OR gate 254, a high at one input to AND gate 252, a low at one input to AND gate 249, a high at one input to NOR gate 258, a low to one input of OR gate 257, a low at one input to NOR gate 244 and therefore a high at pin 5 of the counter 226. Therefore, a count will not be permitted at counter 226, which is the desired result since the load is within the dead band or permissible range.

If the demand count from the comparator board had been lower than the low limit, neither input on lines 261 and 262 would be high. These lows on the two input lines produce a high input to OR gate 254, one high input to AND gate 252, a high input to AND gate 249, and a high input to NOR gate 258. Since this should theoretically result in a reduction in the number of loads off, so that the demand count will increase, it must be determined that the number of loads off is above the minimum through comparator 247. If this is the case, the A greater than B output at pin 13 of comparator 247 will be high, providing a high input to OR gate 253 whose output is then high. This provides a second high input to AND gate 252 whose output in turn provides a second high input to AND gate 249, whose high output provides a high input to NOR gate 244. The output of NOR gate 244 is therefore low enabling a carry-in by counter 226. During normal operation, since the second input to OR gate 257 is low, its output is low and the count permitted is a count down, reducing the number of loads turned off.

Figure 5:
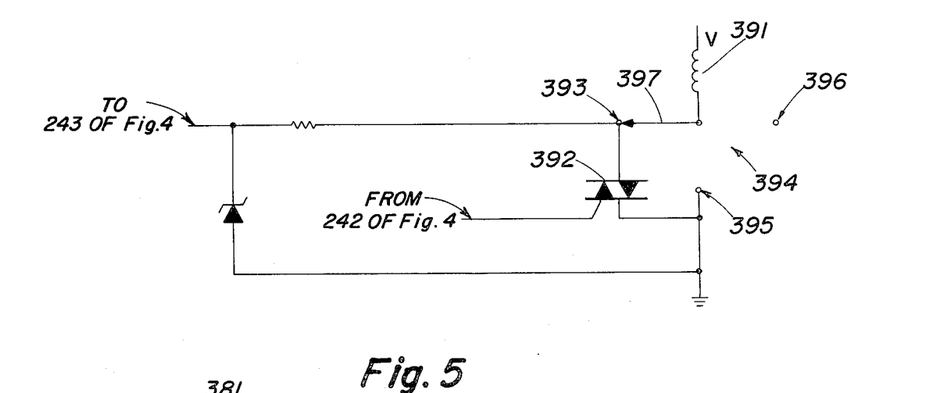
FIG. 5 is a circuit diagram of a typical controlled load coupled from the sequencer of FIGS. 1 and 4.

The control circuitry for one load is shown in FIG. 5. On output line from the sequencer such as 242 is written high or low and latched in that condition until addressed again by an update sequence. 391 is a relay coil operable to close the contacts of a power switch for this load. If line 242 is high, triac 392 is turned on and V(=24 volts a c) is coupled through the relay coil, powering the load. If line 242 is low, the load is off.

At the same time input line 243 is coupled to terminal 393 of a three-position switch 394. With contact 397 at terminal 393, as shown, the 60 hz waveform through the relay coil 391 is coupled to line 243, and when this line is addressed by multiplexer 213 transistor 214 will be pulsed on. This indicates a legitimate load controllable by the triac and a pulse is produced on line 236 for this load.

If contact 397 is connected to terminal 395, the load will remain on at all times; and if the contact is connected to terminal 396, the load will be off at all times. In both of the cases, transistor 214 receives no voltage when this load is addressed and no pulse is produced on line 236.

Additional banks of eight loads may be added by utilizing an additional sequencer with its own set of outputs or, preferably, by paralleling one or more additional loads with each of the eight loads disclosed above.

The display for the various counts and other three digits items is obtained in the display section of the apparatus by connecting the leads from a counter to be displayed to three single-digit display devices whose inputs are in parallel. A different one of the digit scan outputs from counter 17 of FIG. 2, indicated collectively as 78, is provided to each display device. As the three digits are scanned by the counters for the various displays, synchronized as described above, the appropriate scanned digit signal from lines 78 activates the appropriate display device to display the correct digit. Thus each digit of the three digit display for each count is actually activated about one third of the time but at the rate that scanning of the digits occurs, there is no observable flicker etc.

Figure 7:
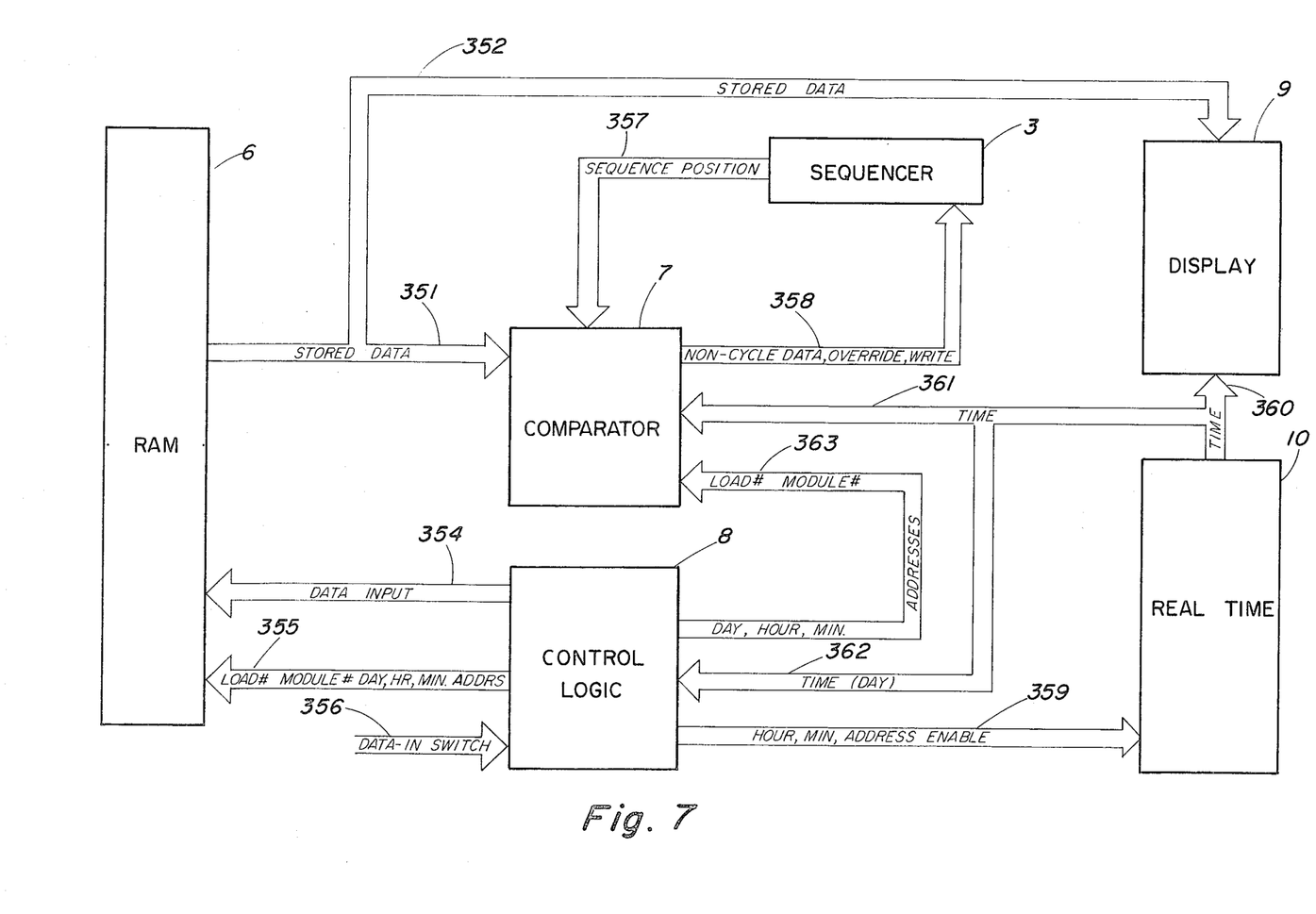
FIG. 7 is a block diagram showing a sequencer similar to that of FIGS. 1 and 4 with additional circuits for overriding and controlling the sequencer for specific loading conditions.

Referring now to FIG. 7, there is shown a block diagram of additional load control circuitry for more sophisticated load control together with the interaction of the additional circuitry with sequencer 3 of FIG. 1. The other elements of FIG. 1 are not illustrated in FIG. 7 since the interaction is essentially with the sequencer.

In FIG. 7, a real time circuit 10 generates signals indicative of the day of the week and time of the day which are coupled to a display 9. Prior to activation of the circuitry of FIG. 7, data is placed into random access memory (RAM) 6 through a control logic circuit 8 from an input line 356. The control logic circuitry is used to address the various sections of the RAM on line 355 while data input occurs on line 354. The RAM is filled with load condition information in its various address locations indicative of the day of the week, the load number and module, or load bank, number.

In operation, the control logic circuit 8 receives day of the week information on line 362 from the real time circuit 10. The control logic circuit 8 then cycles through the various loads and load modules. This information is fed on line 355 to RAM 6 to recall the stored time-on and time-off data from the various address locations. The load number and module number addresses fed to RAM 6 on line 355 are also coupled to a comparator circuit 7 on line 363. The control logic circuit 8 also maintains synchronization as to the hour and minute addresses on line 359 to the real time circuit 10, on line 363 to the comparator, and on line 355 to the RAM. The comparator circuit 7 receives the time information on line 361 from real time circuit 10, this time information being synchronized as to units of minutes, tens of minutes, units of hours and tens of hours by the control logic circuit 8. Thus the RAM 6 couples time of day on and time of day off (sequentially and in synchronization as to units of minutes etc.) information for an addressed load on line 351 to comparator 7. This information is compared to the actual time from the real time circuit 10 on line 361 to determine whether or not a particular load addressed is a legitimate controllable load to be cycled. Thus, from 8 AM on a Tuesday til 5 PM on a Tuesday the RAM information might indicate that load 3 of module or load bank 2 is to be cycled on and off by the sequencer 3. The actual time is compared to the on time (8 AM) and off time (5 PM) from the RAM in comparator 7 and the appropriate resultant is stored and then coupled on line 358 to the sequencer for the load which is in the sequence position as determined by the input on line 357 from the sequencer.

As shown in FIG. 4a, lines 266 containing the address for the sequence position are available to be fed to comparator 7 in the circuit of FIG. 7. As also shown in FIG. 4a, addressable register 237 may be externally controlled at pin 3, its data input, and pin 4, the write command pin. Register 237 writes the data input at pin 3 on a low to pin 4. As shown in FIG. 4a, line 267 may be taken low externally to give a write command to register 237. Similarly line 268 may be taken low to turn off a load or taken high to turn on a load. Also, line 269 may be utilized to ground the base of transistor 214 to prevent a load which is being externally controlled from generating a pulse on line 236, thereby leaving the count in counter 227 the same for a load which is being externally addressed through register 237.

Referring once again to FIG. 7, the stored data from the RAM 6 may be coupled on a line 357 to display 9. Digit scanning for units of minutes etc. done in the circuits shown in FIG. 7 is accomplished by the same means as described above, for example as shown in regard to the counters which are synched together in FIG. 2a. The time information is carried as units of minutes, tens of minutes, units of hours and tens of hours with these digits being scanned and synchronized as described above.

While there have been described above the principles of this invention in connection with specific apparatus, it is to be clearly understood that this description is made only by way of example and not as a limitation in the scope of the invention.

What is claimed is:

1. Energy management apparatus comprising: comparator means for comparing a demand count, indicative of power consumption by a plurality of loads, with a set point count and for producing a load demand indication dependent upon said comparison including,
    a multiple-digit scanned output demand counter receiving demand count pulses,
    a multiple-digit scanned output set point counter receiving set point pulses,
    means for synchronizing scanning of the digits of the counters by stopping digit scanning of a counter which falls behind in the digit scan cycle until the next scan cycle of the driving counter returns the counters to equally significant digits, and
load control means responsive to said load demand indication for controlling the application of power to loads of said plurality of loads.

2. The apparatus of claim 1 in which the comparator means also compares the demand count with a low limit count and produces its load demand indication dependent upon both comparisons and further including a multiple-digit scanned output low limit counter receiving low limit count pulses, the means for synchronizing scanning of the digits also synchronizing the scanning of the digits of the low limit counter.

3. The apparatus of claim 2 in which the load demand indication is updated at the arrival of each demand count pulse and the set point, demand and low limit counters are reset at the end of a selected interval of time designated as a demand period, and further comprising a highest-attained-demand counter, receiving demand count pulses and synchronized for digit scanning by said synchronizing means with the other said counters, including means for receiving and retaining the highest obtained demand count over a series of demand periods.

4. The apparatus of claim 1 which further comprises a plurality of digit display means each associated with a different digit of a digit-scanned counter output each digit display means sequentially receiving all digit information from the counter but being enabled, by a digit scanning pulse from the counter, to display the appropriate digit in synchronization with the reception of the appropriate digit information.

5. The apparatus of claim 1 which further comprises:
real time means for generating a signal indicative of real time;
memory means for storing a range of times for each particular load to be turned on and off; and
real time comparator means for comparing the real time signal with the stored on and off time information for each load of the plurality of loads and for overriding the load control means dependent upon the result of said comparison.

6. Energy management apparatus comprising:
comparator means for comparing a demand count indicative of power consumption by a plurality of loads with a set point count and for producing a load demand indication dependent upon said comparison;
load control means responsive to said load demand indication for controlling the application of power to loads of said plurality of loads;
set point adjustment means responsive to said demand count for adjusting the set point count by a portion of the difference between the two said counts, the set point adjustment means being responsive to said demand count for adjusting the set point count by a portion of the difference between the two said counts; and
said set point adjustment means including a floating set point demand counter, means for synchronizing the floating set point demand counter with the counters of the comparator means, and counter means for adjustably maintaining the set point count and for coupling this count to a comparator in digit synchronization with the floating set point demand counter, and further including means for entering the positive or negative difference between the demand count and set point count in a given period of time, after dividing down by a desired amount, into the counter means.

7. The apparatus of claim 6 in which the means for entering comprises a cascaded counter arrangement whose output is coupled to the counter means and which is operable to count upwardly with the floating set point demand counter in a given period after the floating set point demand count exceeds the set point count, and operable to count downward at the end of said given period by the number of counts that the floating set point demand count is less than the count in said counter means.

8. The apparatus of claim 7 which further includes means for causing said downward count at the end of said given period to be at the digit scanning rate.

9. An energy management method comprising the steps of:
comparing a demand count having a plurality of digits of different significance, indicative of power consumption by a plurality of loads, with a set point count having a plurality of digits of significance corresponding to those of the demand count;
synchronizing the comparison of each pair of equally significant digits within a single comparator in sequence to obtain a resultant load demand indication dependent upon said comparison; and
controlling the application of power to loads of said plurality of loads in response to said load demand indication.

* * * * *